United States Patent [19]
Ro

[11] Patent Number: 5,406,424
[45] Date of Patent: Apr. 11, 1995

[54] SIMULTANEOUS MONITORING DATA TAPE RECORDER HAVING A DATA COMPRESSOR/EXPANDER

[75] Inventor: Il-Young Ro, Suwon, Rep. of Korea

[73] Assignee: SamSung Electronics Co., Ltd., Suwon, Rep. of Korea

[21] Appl. No.: 833,659

[22] Filed: Feb. 11, 1992

[30] Foreign Application Priority Data

Mar. 30, 1991 [KR] Rep. of Korea ............... 1991-5091

[51] Int. Cl.⁶ .............. G11B 5/00; G11B 5/09; G11B 15/14
[52] U.S. Cl. ........................ 360/32; 360/51; 360/64
[58] Field of Search ............ 360/39, 32, 64, 77.14, 360/77.01, 73.05, 72.2, 66, 38.1, 19.1, 51

[56] References Cited

U.S. PATENT DOCUMENTS 4,413,289 11/1983 Weaver et al. ............... 360/51
4,542,419 9/1985 Morio et al. ............... 360/64 X
4,772,960 9/1988 Takahashi et al. ............... 360/32 X
4,853,797 8/1989 Yamada et al. ............... 360/65 X Primary Examiner—John Shepperd
Assistant Examiner—Patrick Wamsley
Attorney, Agent, or Firm—Robert E. Bushnell

[57] ABSTRACT

A data tape recorder having a data compressor/expander for recording digital information on a magnetic recording tape and for reproducing it therefrom. In a digital audio tape recorder having a 4-head deck each provided with two recording heads and two reproducing heads, a switching pulse interval is channel-counted to a multichannel interval, and if the channel count signal and a channel selection signal by user are identical, only a reproducing signal of the selection channel among the signals being reproduced from the reproducing heads is expanded and reproduced. Moreover, in order to record data to a corresponding channel, the expanded reproducing data and compressed input data are multiplexed by the channel selection signal. Thus, the record/reproduction of a multichannel for a long time is possible.

26 Claims, 5 Drawing Sheets

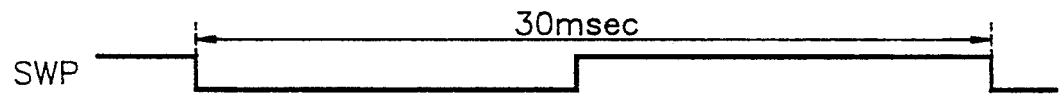
FIG. 5A
FIG. 5B
FIG. 5C
FIG. 5D
FIG. 5E
FIG. 5F
FIG. 5G
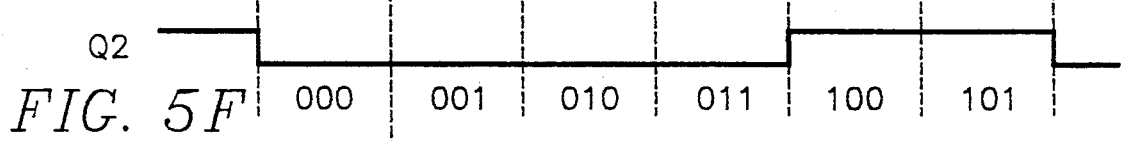
FIG. 5H
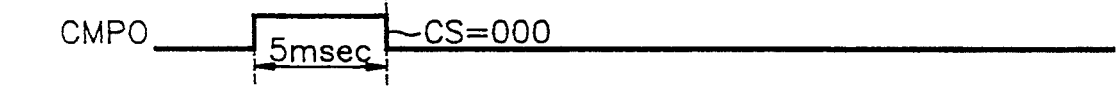
FIG. 5I
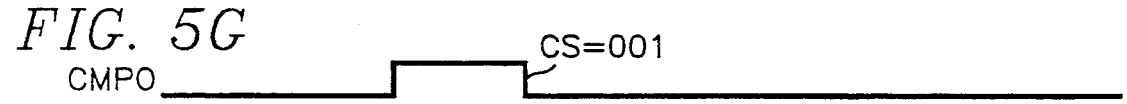
FIG. 5J
FIG. 5K
FIG. 5L

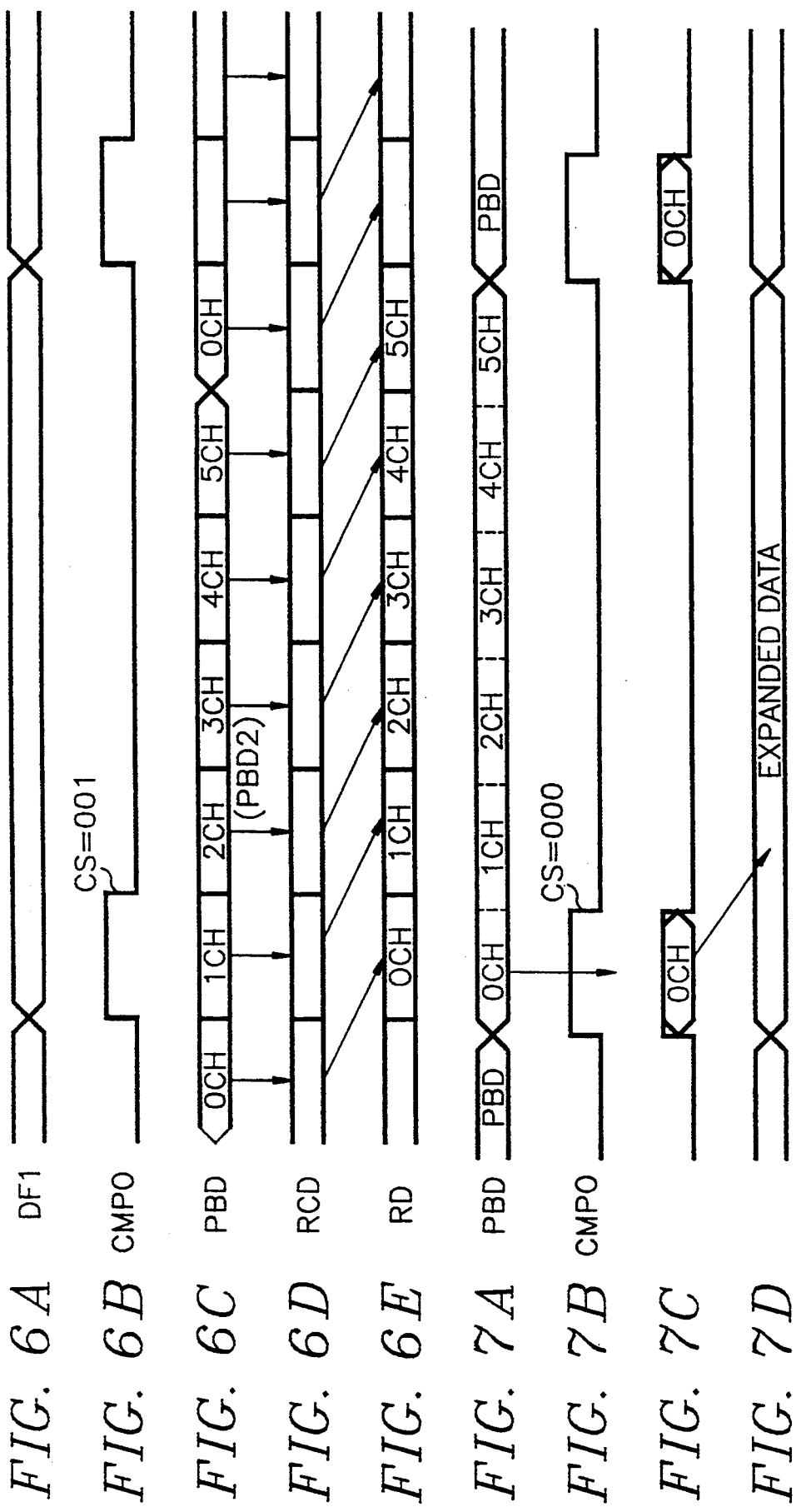

SIMULTANEOUS MONITORING DATA TAPE RECORDER HAVING A DATA COMPRESSOR/EXPANDER

BACKGROUND OF THE INVENTION

The present invention relates to a data tape recorder for recording digital information on a magnetic tape and for reproducing digital information from the tape, and more particularly to a tape recorder having a data compressor/expander, which is capable of recording and reproducing digital information for a long time with a multichannel.

Presently, a digital recording and reproducing system such as a DAT (Digital Audio Tape) system which records and reproduces audio signals by digitally processing the signals, is divided into two main classes: normal mode and long time mode. The normal mode has a sampling frequency of 48 KHz and two channels of 16 bits, while long time mode has a sampling frequency of 32 KHz and two channels of 12 bits.

If the long time mode is permitted in the above DAT system, the recording and reproduction with a 4 mm tape (60 minutes) is possible at a maximum of four hours. Since the sampling frequency of the long time mode is 32 KHz, an actual audio bandwidth becomes about 14.5 KHz. And since the DAT has 12-bit quantization, the tone quality is deteriorated in comparison with 16-bit quantization. That is, when recording the audio signals for a long time with a multichannel, there is a disadvantage in that the tone quality is degraded.

SUMMARY OF THE INVENTION

It is therefore an object of the invention to provide a tape recorder which has a data compressor/expander, capable of recording/reproducing digital information for a long time with a multichannel, in a digital audio tape having a four-head deck.

It is another object of the invention to provide a tape recorder circuit capable of recording input data by compression and capable of reproducing the compressed data by expansion.

It is still another object of the invention to provide a tape recorder circuit capable of recording/reproducing the compressed data with a multichannel.

In accordance with the present invention, a data tape recorder having a rotary head mechanism is provided, for compressing and expanding data, the rotary head mechanism having a drum provided with at least one recording head and at least one reproducing head, for recording input data on a magnetic tape and for reproducing the recorded data from the magnetic tape, respectively. The data tape recorder comprises: an analog to digital converter for converting an input analog signal into a digital signal; a first digital filter for filtering the digital signal from output from the analog to digital converter; a second digital filter for filtering its input digital signal; a digital to analog converter for converting the data signal output from the second digital filter into an analog signal; a first digital signal processor for signal-processing compressed input recording data; a recording amplifier for amplifying the output of the first digital signal processor and providing an amplified output to the rotary head mechanism; a reproducing amplifier for amplifying a reproducing signal generated from the rotary head mechanism; a data strobe for extracting a clock from a reproducing signal obtained from the reproducing amplifier, and producing said clock and a reproducing signal; a second digital signal processor for signal-processing the reproducing signal generated from the data strobe; a system controller for producing a recording/reproducing mode control signal, multichannel selection control signal and servo control signal in response to a key input; a servo for controlling the rotary head mechanism by the control of the system controller and producing a switching pulse; and a data compressing/expanding circuit connected between the first and second digital signal processors and said first and second digital filters, for compressing input data in response to the control of the system controller and for expanding only a signal of a selected channel from among the reproducing signals.

BRIEF DESCRIPTION OF THE DRAWINGS

The above and other objects, advantages and features of the present invention will be more apparent from the detailed description taken with the accompanying drawings, in which:

FIG. 5 shows a series of waveform diagrams, A through L, showing output waveforms of a channel counter and a comparator of FIG. 2;

FIG. 6 shows a series of waveform diagrams, A through E, showing waveforms for the recording operation of FIG. 2; and FIG. 7 shows a series of waveform diagrams, A through D, showing waveforms for the reproducing operation of FIG. 2.

DETAILED DESCRIPTION OF THE PREFERRED EMBODIMENT

Figure 1:
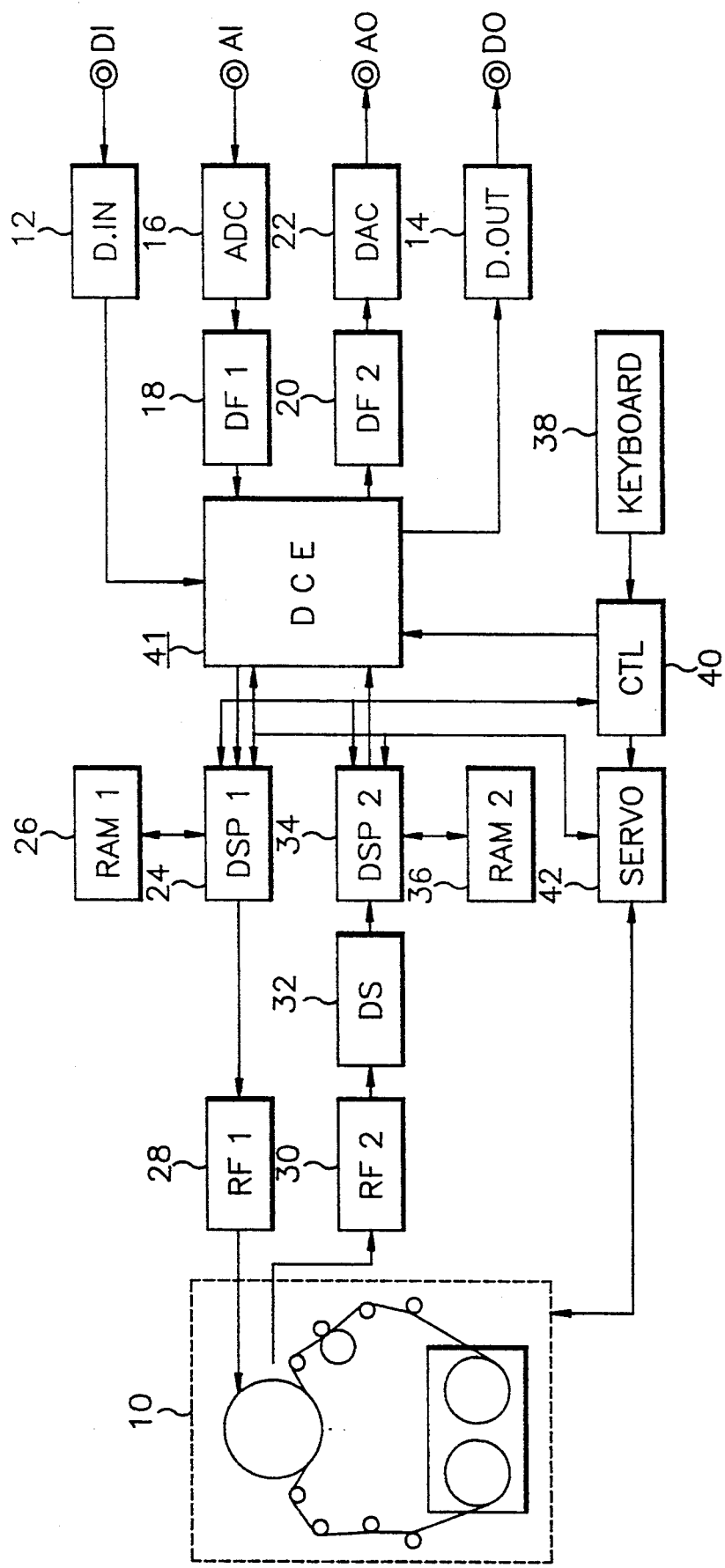
FIG. 1 is a block diagram showing a data tape recorder according to the present invention.

Referring to FIG. 1 of the accompanying diagrammatic drawings, a rotary head mechanism 10 having a drum provided with two recording heads and two reproducing heads, records input information on a magnetic recording tape and reproduces the recorded information from the tape. An input analog signal is converted into a digital signal in an analog to digital converter (ADC) 16, and then supplied to a first digital filter 18 (DF1) for filtering the digital signal output from the ADC 16. The digital signal output from a second digital filter 20 (DF2) for filtering input digital data, is converted into an analog signal in a digital to analog converter (DAC) 22. The compressed input recording data is signal-processed in a first signal processor (DSP1) 24. Recording amplifier 28 amplifies the output of the DSP1 24 to provide the amplified output to the rotary head mechanism 10, and the reproducing amplifier 30 amplifies a reproducing signal originated from the head 10. A data strobe 32 extracts a clock from the reproducing signal of the reproducing amplifier 30, and generates the extracted clock together with the reproducing signal. A second digital signal processor (DSP2) 34 signal-processes the reproducing signal produced from the data strobe 32. A system controller 40 produces a recording/reproducing mode control signal, a multichannel selection control signal and a servo control signal, in response to a key input of a keyboard 38. A servo 42 controls the rotary head mechanism 10 by the control of the system controller 40 and simultaneously generates a switching pulse SWP. A data compressor/expander (DCE) circuit 41 which is connected between the DSP1 24 and the DF1 18 and between the DSP2 34 and the DF2 20, compresses the input data in accordance with the control of the controller 40 to generate a record signal of an assigned channel. Through the DCE circuit 41, only a signal of the assigned channel among the signals being reproduced is expanded.

Figure 2:
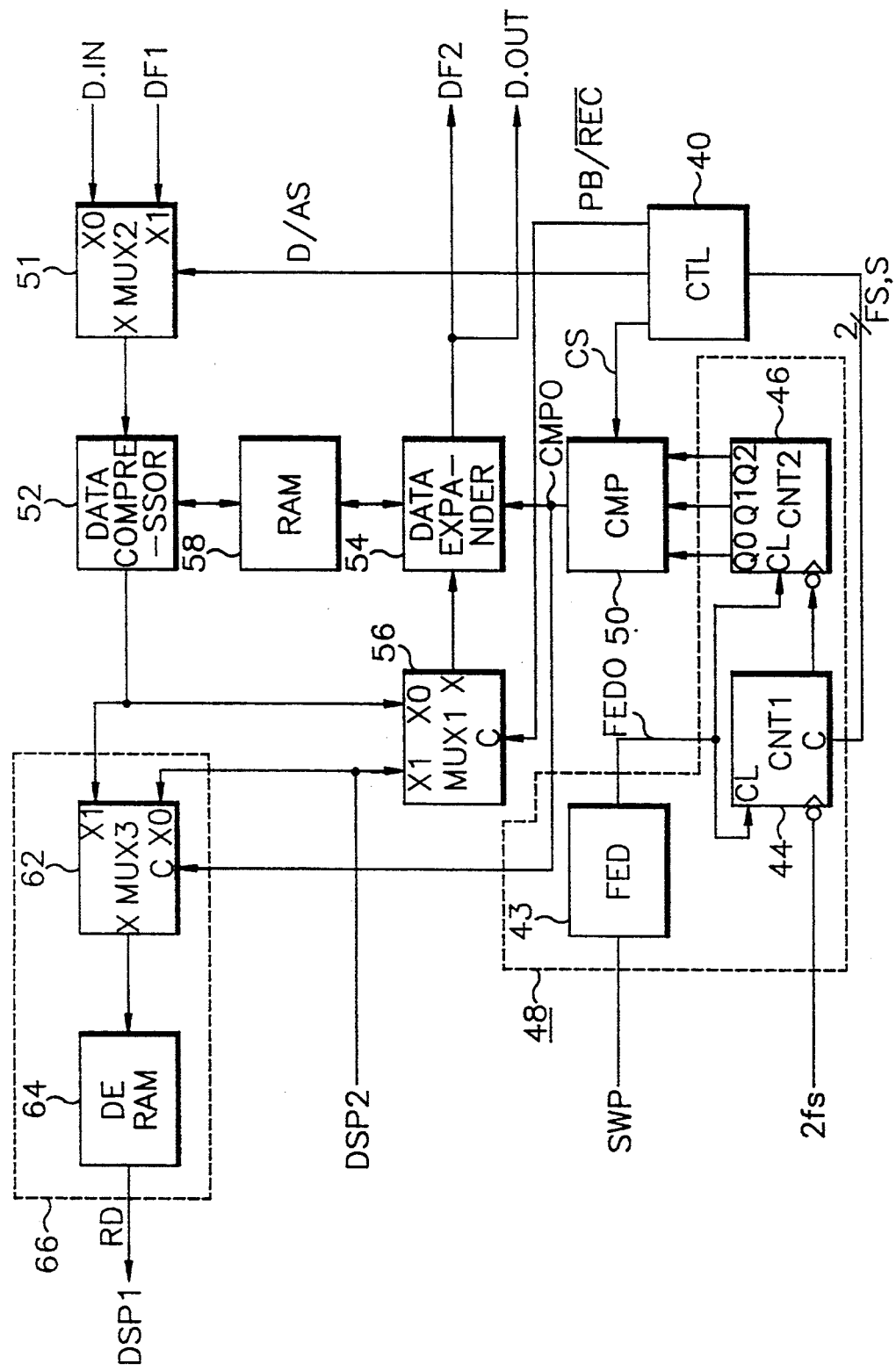
FIG. 2 is a block diagram showing a data compressor/expander circuit of FIG. 1.

FIG. 2 of the accompanying diagrammatic drawings shows a block diagram of the data compressor/expander circuit 41 of FIG. 1. A channel counter 48 receives a switching pulse SWP and a sampling frequency $2f_s$ and generates a channel count signal by determining a channel interval during a switching pulse period in response to the sampling control signals FS and S of the system controller 40. A comparator (CMP) 50 compares the channel count signal of the channel counter 48 with a channel selection signal CS of the controller 40. If the signals Q0, Q1, Q2 and CS are the same, the comparator 50 produces a channel enable signal CMPO. A data compressor 52 compresses input data at a predetermined compression rate. A data expander 54 operates in response to the channel enable signal CMPO of the comparator 50 and expands the input data at a predetermined expansion rate. Either a reproducing signal obtained from the DSP2 34 or a signal produced from the data compressor 52 is selected in a first data multiplexer 56 by the reproducing control signal PB/$\overline{REC}$, the selected signal being fed to the data expander 54. A recording data selection circuit 66 receives and selects either the output of the compressor 52 or the output of the DSP2 34 in response to the channel enable signal CMPO, and provides its output signal to the DSP1 24.

The channel counter 48 includes a falling edge detector 43 for detecting a falling edge of the switching pulse SWP, a first counter 44 which is cleared by the output of the falling edge detector 43, for counting the sampling clock $2f_s$ to a signal of 200 Hz, and a second counter 46 which is cleared by the output of the falling edge detector 43, for counting the output of the first counter 44 to produce a channel count data Q0, Q1, Q2.

Next, the expansion reproducing operation will be described. In the embodiment of this invention, data recording/reproducing apparatus having N channels or N×2 channels, as contrasted with a standard DAT tape, can be described by the following data compressor/expander algorithm. However, for the convenience of the description, the recording/reproducing apparatus having a data compressor/expander with 6 channels will be described.

It is assumed that the compressed data with 6 channels has been recorded on the tape by the recording operation which will be described later.

If user selects a channel by a using a keyboard 38 and applies a read (reproduce) mode control signal to the keyboard 38, the system controller 40 connected to the keyboard 38 provides a servo control signal to the servo circuit 42. Simultaneously the system controller 40 generates the recording/reproducing mode control signal PB/$\overline{REC}$ of a logic "high" state, and supplies a channel selection signal CS to the DCE circuit 41. In this case, if reproducing heads a and b of FIG. 3 pick up a compressed-recorded signal by the switching pulse SWP obtained from the servo circuit 42, as shown in FIG. 4, waveform B, the reproducing amplifier 30 amplifies the signal and supplies the amplified signal to the data strobe 32.

The output of the data strobe 32 is applied to the DSP2 34 as a pulse signal. The DSP2 34 signal-processes the pulse signal to apply an output signal like the reproducing signal PBD indicated in FIG. 4, waveform C to a terminal X1 of the first multiplexer 56. Then, the first multiplexer 56 selects the reproducing signal applied to the terminal X1 by the reproducing mode control signal PB/$\overline{REC}$ of the system controller 40, providing the reproducing signal to the data expander 54.

Meanwhile, the falling edge detector (FED) 43 of the pulse counter 48 detects a falling edge of the switching pulse SWP shown in FIG. 5, waveform A, to generate a signal as shown in FIG. 5, waveform B of the accompanying diagrammatic drawings. Thereby the first and second counters 44 and 46 are cleared. Moreover, the first counter 44 divides an input sampling clock, supplying a pulse shown in FIG. 5, waveform C to the second counter 46. The second counter 46 counts the output of the first counter 44 by 3-bit binary notation and supplies channel counting data Q0, Q1 and Q2 shown in FIG. 5, waveform D through FIG. 5, waveform F to the comparator 50. If the channel selected by the user is 0 a channel (0 is channel number), the channel selection signal CS originated from the system controller 40 becomes 000. Then, the output of the channel enable CMPO of the comparator 50 becomes a logic "high" state as shown in FIG. 5, waveform G. Therefore, the expander 54 to which the reproducing signal of 6 channels is applied as shown in FIG. 4, waveform C expands only 0 channel data by the channel selection signal CS=000, supplying its output to the second digital filter 20 and a digital out (DOUT) 14. That is, as shown in FIG. 7, waveform C, the expander 54 expands only 0 channel data among the reproducing data PBD of 6 channels of FIG. 7, waveform A by the channel selection enable signal CMPO of FIG. 7, waveform B generated from the comparator 50. Thereafter the expander 54 produces the expanded data as shown in FIG. 7, waveform D.

In this case, the data transmitted from the DCE circuit to the second digital filter 20 is converted into an analog signal in the DAC 22. The expanded reproducing data from the DCE circuit is also applied to the digital out 14 to generate a digital signal.

The channel enable signal CMPO produced from the comparator 50 is converted into waveforms indicated in FIG. 5, waveform G to FIG. 5, waveform L by the channel selection signal CS generated from the controller 40 in response to the channel selection of the user. Here, the respective channel of the reproducing data PBD having 6 channels can be expanded by the varied channel enable signal CMPO such as FIGS. 5, waveform G to L. Therefore, if the reproducing operation is carried out with the channel enable signal CMPO alternatively and successively changed from 0 channel up to 5 channel by the proper channel selection, the expansion and reproduction of 6 times in comparison with conventional reproducing time is possible.

Next, the compression recording operation is described. If the user selects a recording mode, analog/digital input and a recording channel by means of the keyboard 38, the controller 40 generates control signals in response to an input signal applied from the keyboard 38.

In case of selecting 1 channel under the condition that digital input is selected, the system controller 40 produces the recording/reproducing mode control signal PB/REC of a logic "low" state, a digital/analog signal D/AS of a logic "high" state and the channel selection signal CS of 001 state. Hence, the first multiplexer 56 generates data of the input terminal X0 through its output terminal X, and the second multiplexer 51 selects the output of a digital input DIN 12 to be produced to its output terminal X. Input data as indicated in FIG. 6, waveform A, which is applied to the data compressor 52 from the digital input DIN 12 by the selective operation of the second multiplexer 51, is compressed through the data compressor 52 and then supplied to a third multiplexer 62 and the first multiplexer 56. In this case, the comparator 50 compares the output of the second counter 46 with the channel selection signal CS=001 generated from the controller 40. If they are the same, the channel enable signal CMPO indicated in FIG. 5, waveform H is varied as shown in FIG. 6, waveform B.

Figure 3:
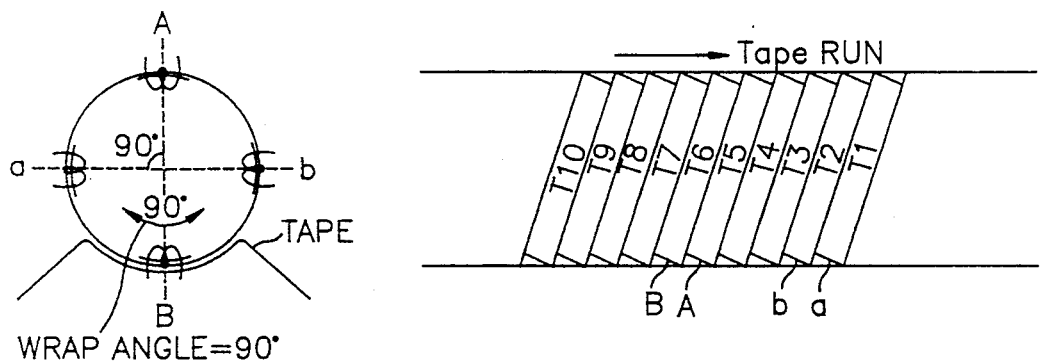
FIG. 3 is a diagram showing a head drum and a format of a magnetic tape of FIG. 1, respectively.

In this case, if the rotary head mechanism 10 is operated by the operation of the servo circuit 42, the reproducing heads a and b of FIG. 3 reproduce the signal shown in FIG. 4, waveform B. The signal of FIG. 4, waveform B as mentioned above is signal-processed by the DSP2 34. Then the signal- processed signal as shown in FIG. 6, waveform C is applied to the input terminals X1 and X0 of the first and third multiplexers 56 and 62, respectively.

The reproducing data of 0 channel among the reproducing data PBD indicated in FIG. 6, waveform C is produced as shown in FIG. 6, waveform D through the terminals X0 and X of the third multiplexer 62, by the channel enable signal CMPO of a logic "low" state shown in FIG. 6, waveform B. After the reproducing data of 0 channel of FIG. 6, waveform C is supplied to the third multiplexer 62, if the channel enable signal CMPO of the comparator 50 becomes a logic "high" state as shown in FIG. 6, waveform B, the third multiplexer 62 selects the data of the input terminal X1 and produces it through the output terminal X. Moreover, the data expander 54 receives the compressed data from the compressor 52 through the first multiplexer 56 and expands the compressed data. Therefore, if the output of the comparator 50 becomes a logic "high" state as indicated in FIG. 6, waveform B, the compressed data by the compressor 52 is produced as the recording data RCD as shown in FIG. 6, waveform D through the third multiplexer 62 at 1 channel region of the reproducing data PBD. Simultaneously the compressed data is expanded in the data expander 54. That is, the user comes to monitor the compressed and recorded data with the data generated from the data expander 54. If the channel enable signal CMPO indicated in FIG. 6, waveform B becomes a logic "low" state, the reproduced data of 2 to 5 channels shown in FIG. 6, waveform C is produced through the third multiplexer 62. The recording data RCD of FIG. 6, waveform D produced from the third multiplexer 62 is delayed as much as about 5 milliseconds by a delay random access memory 64, as shown in FIG. 6, waveform E, and then is recorded through the DSP1 24 and the recording amplifier 28.

Figure 4A:
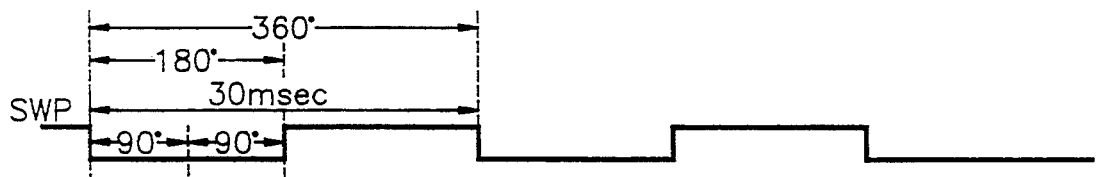
FIG. 4 consists of a series of waveform diagrams, A through E, showing recording/reproducing waveforms of FIG. 1.
Figure 4B:
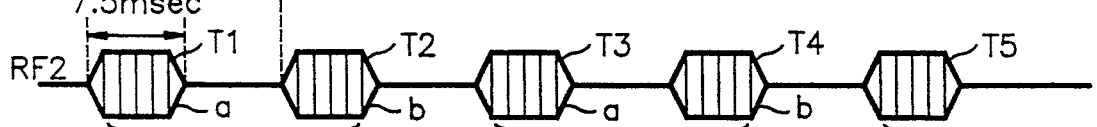
Figure 4C:
Figure 4D:
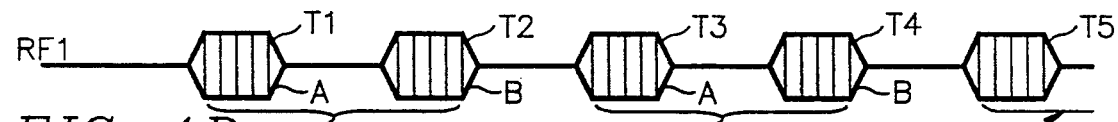
Figure 4E:
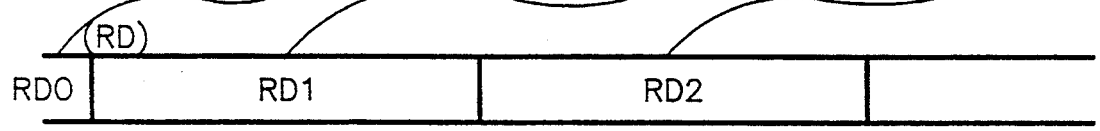

Hence, the reproducing heads a and b reproduce the track data of tracks T3 and T4 and apply the reproduced data to the DSP2 34. The recording heads A and B record the data which is presented at terminal X0 and generated at terminal X of multiplexor 62 and the compressed data through the data compressor 52, corresponding to the channel selection signal, which is generated through terminal X of multiplexor 62 onto the tracks T3 and T4 as shown in FIG. 4D.

As described above, since the compressing/expanding operation of data is carried out and simultaneously the data is recorded on a magnetic tape and reproduced therefrom with a multichannel, there is no deterioration of the data, and data processing of a large capacity is possible.

While the present invention has been particularly shown and described with reference to the preferred embodiment thereof, it will be understood by those skilled in the art that various changes in form and details may be made without departing from the spirit and scope of the invention as defined by the appended claims.

What is claimed is:

1. A data tape recorder having a rotary head mechanism, for compressing and expanding data, said rotary head mechanism having a drum provided with at least one recording head and at least one reproducing head, for recording input data on a magnetic tape and for reproducing compressed-recorded data from the magnetic tape to generate reproducing signals, said data tape recorder comprising:
   process means for signal-processing a compressed signal and said reproducing signal of a digital input signal;
   amplifying means for amplifying an output of said process means and an output of said rotary head mechanism;
   data strobe means for extracting a clock from said reproducing signal obtained from said amplifying means, and providing both said clock and said reproducing signal to said process means;
   system controlling means for producing a recording-/reproducing mode control signal, a channel selection control signal and a servo control signal in response to a key input;
   servo means for controlling said rotary head mechanism in response to said servo control signal and for producing a switching pulse; and
   data compressing/expanding means connected between said process means and said filtering means, for compressing said digital input signal in response to said recording/reproducing mode control signal of said system controlling means, and for expanding only a signal of a selected channel from said reproducing signals; and
   first multiplexing means for separately enabling transmission of said output of said process means and output of said data compressing/expanding means to said data compressing/expanding means in response to said reproducing/recording mode control signal.

2. A circuit as claimed in claim 1, wherein said data compressing/expanding means is comprised of:
   channel counting means receiving said switching pulse and a sampling frequency, for generating a channel count signal by determining a channel interval during the switching pulse period in response to a sampling control signal of said system controlling means;
   comparing means for comparing said channel count signal of said channel counting means with said channel selection control signal of said system controlling means, and producing a channel enable signal when said channel count signal and said channel selection signal are the same;

data compressing means for compressing said digital input signal at a given compression rate to generate said compressed signal;

data expanding means being operated by said channel enable signal of said comparing means, for expanding said compressed signal data at a given rate;

multiplexing means for alternately selecting one of said reproducing Signals obtained from said process means and compressed signal, in response to said recording/reproducing mode control signal of said system controlling means; and recording data selecting means for alternately selecting one of said compressing signal and said reproducing signal in response to said channel enable signal, and for delaying the selected output for a given time to provide a delayed signal to said signal process means.

3. A circuit as claimed in claim 2, wherein said channel counting means is comprised of:

falling edge detecting means for detecting a falling edge of said switching pulse;

first counting means being cleared by an output of said falling edge detecting means, for counting a sampling clock of said sampling frequency to a signal of 200 Hz; and second counting means being cleared by said output of said falling edge detecting means, for counting an output of said first counting means.

4. A data tape recorder, comprising:

a rotary head mechanism, for simultaneously recording a recording signal with a first plurality of channels onto a recording medium and for reproducing a reproducing signal with a second plurality of channels from the recording medium;

processing means for signal processing a first compressed signal to generate said recording signal, and for signal processing said reproducing signal to generate a processed signal;

system control means for producing a reproducing/recording mode control signal, a channel selection signal and a servo control signal in response to input by a user;

servo means for controlling said rotary head mechanism in response to said servo control signal, and for generating a switching pulse;

data compressing/expanding means for compressing a digital input signal, and for expanding and transmitting only one of said channels of said reproducing signals according to said channel selection signal input by the user to generate a digital output signal; and first multiplexing means for alternately enabling transmission of said processed signal and said digital output signal to said data compressing/expanding means in response to said reproducing/recording mode control signal.

5. The data tape recorder as claimed in claim 4, wherein said data compressing/expanding means comprising:

channel counting means for generating a channel counting signal by counting a sampling clock of a sampling during a period of said switching pulse in response to sampling control signals from said system control means;

comparator means for making a comparison between said channel counting signal and said channel selection signal to produce a channel enable signal when said channel count signal and said channel selection signal are the same; and data expanding means for expanding said processed signal at a given rate in response to said channel enable signal to generate said digital output signal.

6. The data tape recorder as claimed in claim 5, wherein said channel counting means comprises:

falling edge detector means for detecting a falling edge of said switching pulse to generate a clearing signal;

first counting means for counting said sampling clock of said sampling frequency in response to said clearing signal and said sampling control signals to generate a counted signal;

second counting means for counting said counted signal in response to said clearing signal to generate said channel counting signal in a multiple bit notation form.

7. A data tape recorder, comprising:

a rotary head mechanism, for simultaneously recording a recording signal with a first plurality of channels onto a recording medium and for reproducing a reproducing signal with a second plurality of channels of the recording medium;

processing means for signal processing a first compressed signal to generate said recording signal, and for signal processing said reproducing signal to generate a processed signal;

system control means for producing a reproducing/recording mode control signal, a channel selection signal and a servo control signal in response to an input by a user;

servo means for controlling said rotary head mechanism in response to said servo control signal, and for generating a switching pulse;

channel counting means for generating a channel counting signal by counting pulses of a sampling clock having a sampling frequency during a period of said switching pulse in response to sampling control signals from said system control means;

comparator means for making a comparison between said channel counting signal and said channel selection signal to produce a channel enable signal when said channel count signal and said channel selection signal are the same;

data expanding means for expanding said processed signal at a set rate in response to said channel enable signal to generate said digital output signal;

data compressing means for compressing said digital input signal to generate a second compressed signal;

recording data selection means for alternately enabling transmission of said second compressed signal and said processed signal in response to said channel enable signal to generate said first compressed signal; and first multiplexing means for alternately enabling transmission of said processed signal and said second compressed signal to said data expanding means in response to said reproducing/recording mode control signal.

8. The data tape recorder as claimed in claim 7, wherein said recording data selection means comprises:

second multiplexing means for alternately enabling transmission of said processed signal and said second compressed signal in response to said channel enable signal to generate said first compressed signal; and delay means for delaying transmission of said first compressed signal.

9. The data tape recorder as claimed in claim 7, wherein said delay means is a delay random access memory.

10. The data tape recorder as claimed in claim 7, further comprising:

amplification means located between said processing means and rotary head mechanism for amplifying said recording signal and amplifying said reproducing signal; and data strobe means located between said amplification means and said processing means for extracting a clock signal from said reproducing signal received from said amplification means, and for providing said clock signal and said reproducing signal to said processing means.

11. The data tape recorder as claimed in claim 10, wherein:

said processing means comprises:

first processor means for signal processing said first compressed signal to generate said recording signal; and second processor means for signal processing said reproduced signal output from said data strobe means; and said amplification means comprises:

first amplifying means for amplifying said recording signal; and second amplifying means for amplifying said reproducing signal.

12. The data tape recorder as claimed in claim 7, wherein said data compressing/expanding means further comprises:

second multiplexing means for alternately enabling transmission of a direct digital signal and a first filtered signal to said data compressing means as said digital input signal in response to an input control signal from said system control means.

13. The data tape recorder as claimed in claim 12, further comprising:

first conversion means for converting an analog input signal to a converted first digital signal; and second conversion means for converting said digital output signal to an analog output signal.

14. The data tape recorder as claimed in claim 10, further comprising:

second multiplexing means for alternately enabling transmission of a direct digital signal and a first filtered signal to said data compressing means as said digital input signal in response to an input control signal from said system control means;

first conversion means for converting an analog input signal to a converted first digital signal; and second conversion means for converting said digital output signal to an analog output signal.

15. The data tape recorder as claimed in claim 5, further comprising:

data compressing means for compressing said digital input signal to generate a second compressed signal;

recording data selection means for transmitting every channel of said processed signal, except a recording channel selected by the user, and for transmitting said selected recording channel of said second compressed signal, to generate said first compressed signal;

first multiplexing means for enabling transmission of said second compressed signal to said data expanding means during a recording mode;

said data expanding means only expanding said selected recording channel of said second compressed signal to generate said digital output signal during said recording mode.

16. The data tape recorder as claimed in claim 15, wherein said channel counting means comprises:

falling edge detector means for detecting a falling edge of said switching pulse to generate a clearing signal;

first counting means for counting said sampling clock of said sampling frequency in response to said clearing signal and said sampling control signals to generate a counted signal;

second counting means for counting said counted signal in response to said clearing signal to generate said channel counting signal in a multiple bit notation form.

17. A method of recording with a first plurality of channels onto recording medium and of reproducing a reproducing signal with a second plurality of channels from the recording medium, said method comprising the steps of:

receiving a recording/reproducing mode control signal and a channel selection signal from a user;

reading said reproducing signal from the recording medium;

signal processing said reproducing signal to generate a processed signal;

data expanding only a selected channel during a reproducing mode in response to a channel selected by the user to generate an digital output signal; and enabling transmission of every channel of said processed signal except said selected recording channel, and enabling transmission of said selected recording channel of said compressed signal to generate said recording signal.

18. The method as claimed in claim 17, wherein said step of data expanding only a selected channel during said reproduction mode further comprises the steps of:

counting a sampling clock of a sampling frequency during a period of a head switching pulse to generate a channel counting signal;

making a comparison between said channel counting signal and said channel selection signal to generate a channel enable signal when said channel counting signal and said channel selection signal are the same; and data expanding said processed signal in response to said channel enable signal to generate said digital output signal.

19. A method of recording with a first plurality of channels onto a recording medium and of reproducing a reproducing signal with a second plurality of channels from the recording medium, comprising:

receiving a recording/reproducing mode control signal and a channel selection signal from a user;

reading said reproducing signal from the recording medium;

signal processing said reproducing signal to generate a processed signal;

data expanding only a selected channel during a reproducing mode in response to a channel selected by the user to generate an digital output signal; and counting a sampling clock of a sampling frequency during a period of a head switching pulse to generate a channel counting signal;

making a comparison between said channel counting signal and said channel selection signal to generate a channel enable signal when said channel counting signal and said channel selection signal are the same;

data expanding said processed signal in response to said channel enable signal to generate said digital output signal;

data compressing a digital input signal during a recording mode to generate a compressed signal;

data expanding only a selected channel during said recording mode in response to a recording channel selected by the user to generate said digital output signal; and enabling transmission of every channel of said processed signal except said selected recording channel, and enabling transmission of said selected recording channel of said compressed signal to generate said recording signal.

20. The method as claimed in claim 19, wherein said step of data expanding only a selected channel during a recording mode further comprises the steps of:

counting a sampling clock of a sampling frequency during a period of a head switching pulse to generate a channel counting signal;

making a comparison between said channel counting signal and said channel selection signal to generate a channel enable signal when said channel counting signal and said channel selection signal are the same; and data expanding said compressed signal in response to said channel enable signal to generate said digital output signal.

21. The method as claimed in claim 20, further comprising the step of delaying said recording signal after said recording signal is generated.

22. The method as claimed in claim 18, further comprising the steps of:

amplifying said recording signal recorded from the recording medium to generate an amplified signal;

extracting a clock signal from said amplified signal and transmitting said clock signal and said amplified signal to be signal processed.

23. The method as claimed in claim 19, further comprising the steps of:

amplifying said reproducing signal recorded from the recording medium to generate an amplified signal;

extracting a clock signal from said amplified signal and transmitting said clock signal and said amplified signal to be signal processed; and amplifying said reproducing signal before recording said recording signal onto the recording medium.

24. The method as claimed in claim 23, further comprising the steps of:

converting an analog input signal to produce said digital input signal; and converting said digital output signal to produce an analog output signal.

25. The method as claimed in claim 19, further comprising the steps of:

converting an analog input signal to produce said digital input signal; and converting said digital output signal to produce an analog output signal.

26. The data tape recorder as claimed in claim 4, including monitoring means for monitoring said compressed signal while said signal control means produces said recording mode signal, by monitoring said expanded signal.

* * * * *